United States Patent
Ideshio et al.

(10) Patent No.: US 9,440,639 B2
(45) Date of Patent: Sep. 13, 2016

(54) CONTROL DEVICE FOR VEHICLE

(75) Inventors: Yukihiko Ideshio, Nissin (JP); Terufumi Miyazaki, Toyota (JP); Yuji Inoue, Nissin (JP); Shingo Eto, Gamagori (JP); Yousuke Michikoshi, Miyoshi (JP); Akihiro Sato, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/352,534

(22) PCT Filed: Dec. 2, 2011

(86) PCT No.: PCT/JP2011/077962
§ 371 (c)(1),
(2), (4) Date: Apr. 17, 2014

(87) PCT Pub. No.: WO2013/080380
PCT Pub. Date: Jun. 6, 2013

(65) Prior Publication Data
US 2014/0288748 A1    Sep. 25, 2014

(51) Int. Cl.
*B60W 20/00* (2016.01)
*B60W 10/06* (2006.01)
*B60W 10/08* (2006.01)
*B60W 10/18* (2012.01)
*B60K 6/48* (2007.10)
*B60W 10/115* (2012.01)
*B60W 30/18* (2012.01)

(52) U.S. Cl.
CPC ............... *B60W 20/00* (2013.01); *B60K 6/48* (2013.01); *B60W 10/06* (2013.01); *B60W 10/08* (2013.01); *B60W 10/115* (2013.01); *B60W 10/18* (2013.01); *B60W 20/10* (2013.01); *B60W 30/18072* (2013.01); *B60W 2550/142* (2013.01); *B60W 2720/10* (2013.01); *Y02T 10/6221* (2013.01); *Y02T 10/7258* (2013.01)

(58) Field of Classification Search
CPC ....... B60K 6/48; B60W 10/06; B60W 10/18; B60W 10/115; B60W 10/08; B60W 20/10; B60W 20/00; B60W 30/18072; Y02T 10/7258; Y02T 10/6221
See application file for complete search history.

(56) References Cited

U.S. PATENT DOCUMENTS

| | | | | |
|---|---|---|---|---|
| 4,485,444 A | * | 11/1984 | Maruyama | B60K 31/18 340/449 |
| 5,287,773 A | * | 2/1994 | Nakawaki | B60W 30/18 477/110 |
| 7,244,003 B2 | * | 7/2007 | Larson | 303/191 |
| 7,702,432 B2 | * | 4/2010 | Bandai | B60T 1/10 180/65.1 |
| 2006/0100768 A1 | * | 5/2006 | Lock | B60K 31/04 701/93 |

(Continued)

FOREIGN PATENT DOCUMENTS

| | | |
|---|---|---|
| JP | H04-303030 A | 10/1992 |
| JP | 2002-011127 A | 1/2002 |
| JP | 2004-204963 A | 7/2004 |
| JP | 2005-014692 A | 1/2005 |
| JP | 2005-138816 A | 6/2005 |
| JP | 2005-162203 A | 6/2005 |
| JP | 2009-179208 A | 8/2009 |
| JP | 2010-229910 A | 10/2010 |

*Primary Examiner* — Mussa A Shaawat
(74) *Attorney, Agent, or Firm* — Dinsmore & Shohl LLP

(57) ABSTRACT

Disclosed is a control device for a vehicle including an engine and a motor generator both for supplying a travel driving force to a driving wheel. The control device causes the engine to stop while the vehicle is traveling on a descending slope under constant vehicle speed control where the vehicle is controlled to travel at a predetermined vehicle speed. That reduces a load on a brake device.

11 Claims, 3 Drawing Sheets

(56) References Cited

U.S. PATENT DOCUMENTS

| | | | | |
|---|---|---|---|---|
| 2008/0023238 A1* | 1/2008 | Shimizu | ............... | B60K 6/365 180/65.265 |
| 2010/0048354 A1* | 2/2010 | Leibbrandt | ......... | F16H 61/0059 477/172 |
| 2010/0318255 A1* | 12/2010 | Li | ................ | B60T 8/172 701/31.4 |
| 2011/0011380 A1* | 1/2011 | Lagerlof et al. | ............... | 123/573 |
| 2011/0083918 A1* | 4/2011 | Kshatriya | ............... | 180/65.26 |
| 2011/0083919 A1* | 4/2011 | Kshatriya | ............... | 180/65.26 |
| 2013/0054062 A1* | 2/2013 | Matsushita | ............ | B60K 6/448 701/22 |
| 2015/0321671 A1* | 11/2015 | Simmons | ............ | B60W 30/143 701/48 |

* cited by examiner

CONTROL DEVICE FOR VEHICLE

TECHNICAL FIELD

The present invention relates to a control device for a vehicle including an engine and a motor generator.

BACKGROUND ART

Conventional hybrid vehicles are well known which include an engine and a motor generator for output of a travel driving force to driving wheels (see, for example, Patent Document 1).

The hybrid vehicle of Patent Document 1 is capable of crawling where the vehicle travels while maintaining a very low, constant vehicle speed (e.g., 1 to 5 km/h) to travel off-road and on slippery road surfaces. During crawling, the hybrid vehicle automatically controls the travel driving force output of the engine and the braking force output of the friction brake device collectively, without the driver having to manipulate the accelerator pedal and the brake pedal, in order to maintain a very low, constant vehicle speed. Crawling thus liberates the driver (operator) from manipulation of the accelerator pedal and the brake pedal and allows the driver to concentrate on steering. That alleviates the driver's workload, for example, in off-road driving.

A drawback of crawling is that the braking force output of the friction brake device needs to be frequently increased and decreased during crawling. That will place a heavy load on the friction brake device and likely raise the temperature of the friction brake device. The hybrid vehicle of Patent Document 1 reduces the load on the friction brake device by operating the motor generator as an electric power generator to generate a braking force during crawling. In other words, the hybrid vehicle reduces the braking force output of the friction brake device by utilizing the braking force output of the motor generator as part of the required braking force, thereby being capable of restraining rises in the temperature of the friction brake device.

CITATION LIST

Patent Literature

Patent Document 1:
Japanese Patent Application Publication, Tokukai, No. 2009-179208

SUMMARY OF THE INVENTION

Problems to be Solved by the Invention

The conventional hybrid vehicle of Patent Document 1, however, keeps the engine running during crawling, thereby allowing the engine to generate at least an idle torque. That presents difficult problems in further reducing the load on the friction brake device.

The present invention has been conceived to address these problems. It is an object of the present invention to provide a control device for a vehicle allowing for reduction of load on the brake device.

Solution to Problem

A control device for a vehicle of the present invention is a control device for a vehicle including an engine and a motor generator both for supplying a travel driving force to a driving wheel, the control device causing the engine to stop while the vehicle is traveling on a descending slope under constant vehicle speed control where the vehicle is controlled to travel at a predetermined vehicle speed.

This configuration does not allow the engine to generate an idle torque, rendering the travel driving force output to the driving wheel smaller than during idling. The load on the brake device is thus reduced.

The control device may implement the constant vehicle speed control by causing a brake device on the vehicle to supply a braking force while causing the motor generator to supply a travel driving force.

This configuration accomplishes the constant vehicle speed control even if the engine is stopped while the vehicle is traveling on a descending slope.

In this case, the control device may allow the motor generator to supply a braking force when the temperature of the brake device has risen.

This configuration utilizes the braking force output of the motor generator as part of the required braking force, thereby being capable of reducing the braking force output of the brake device. The load on the brake device is thus further reduced.

The control device for a vehicle in which the motor generator supplies a braking force may allow the motor generator to supply a braking force which grows larger with a rise in the temperature of the brake device.

This configuration enables the motor generator to further reduce the load on the brake device as the load on the brake device grows larger.

The control device may be such that the vehicle further includes a fluid power transmission between the motor generator and the driving wheel, the control device causing the fluid power transmission to have a lower input rotational speed transmitted from the motor generator than an output rotational speed transmitted to the driving wheel.

This configuration, including a fluid power transmission, allows the motor generator (input shaft of the fluid power transmission) to keep rotating even if the driving wheel (output shaft of the fluid power transmission) has stopped rotating. That prevents the motor generator from being locked. In addition, the configuration allows the fluid power transmission to have a lower input rotational speed than an output rotational speed. That enables transmission of the braking force output of the motor generator to the driving wheel.

The control device may be such that the vehicle further includes a clutch between the engine and the motor generator, the control device causing the clutch to be released when the engine has stopped while the vehicle is traveling on a descending slope.

This configuration, including a clutch between the engine and the motor generator, is capable of reducing the load on the brake device.

The control device may be such that the predetermined vehicle speed is a very low vehicle speed at which the vehicle travels off-road.

This configuration is capable of reducing the load on the brake device in off-road driving.

Another control device for a vehicle of the present invention is a control device for a vehicle including an engine and a motor generator both for supplying a travel driving force to a driving wheel, the control device causing the engine to stop while the vehicle is traveling on a descending slope under constant vehicle speed control where the vehicle is controlled to travel at a predetermined vehicle speed if the predetermined vehicle speed is a very low vehicle speed, and the control device not causing the engine to stop under the constant vehicle speed control if the predetermined vehicle speed is not a very low vehicle speed (if the predetermined vehicle speed is a high vehicle speed).

Advantageous Effects of the Invention

The control device for a vehicle of the present invention is capable of reducing load on the brake device.

DESCRIPTION OF EMBODIMENT

The following will describe an embodiment of the present invention in reference to drawings.

Mechanical Structure

First, in reference to FIG. 1, a mechanical structure (drive mechanism) of a hybrid vehicle 100 provided with an ECU 11 of an embodiment of the present invention will be described.

Figure 1:
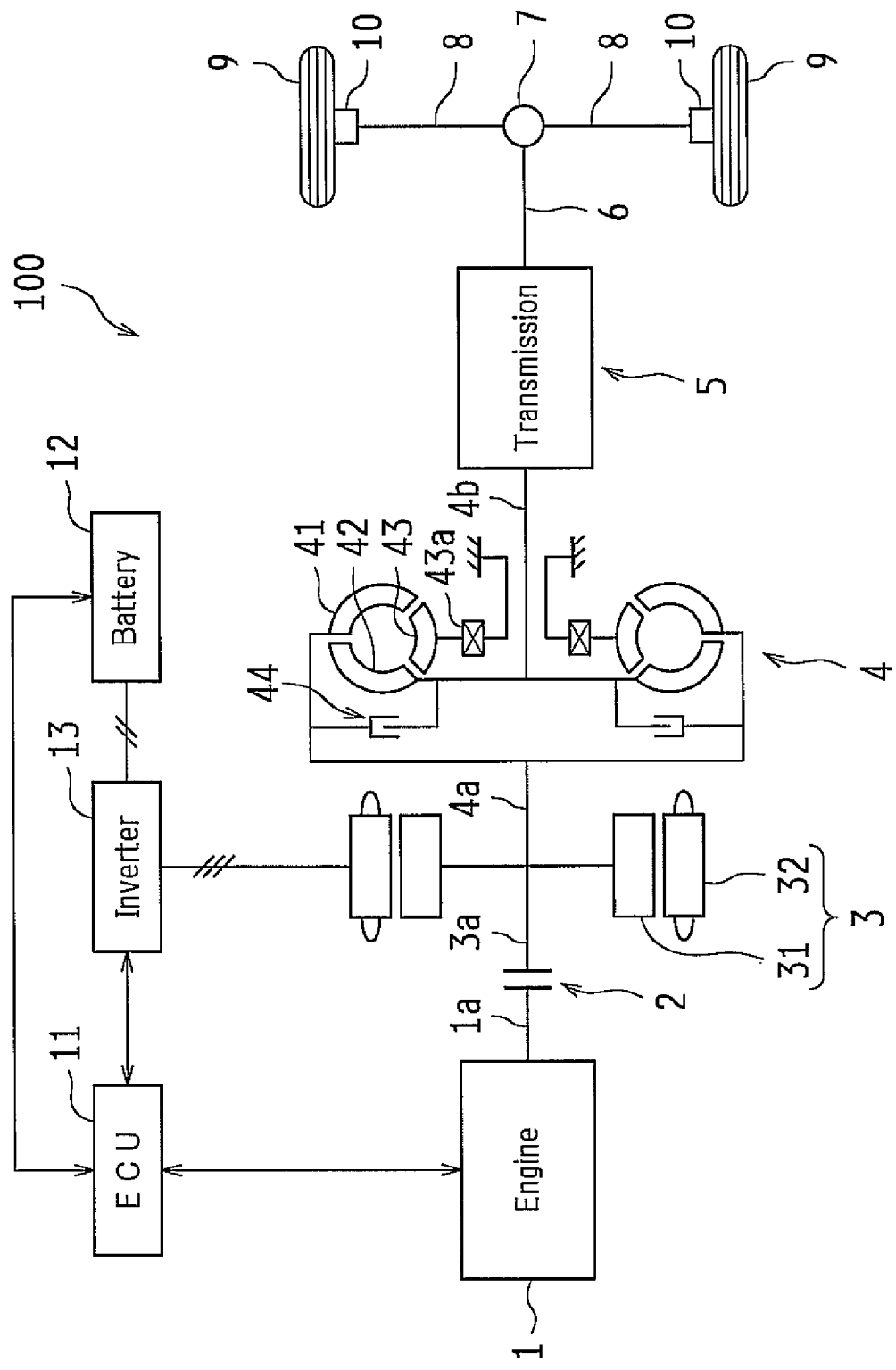
FIG. 1 is a schematic diagram representing the overall structure of a hybrid vehicle provided with an ECU of an embodiment of the present invention.

The hybrid vehicle 100, as illustrated in FIG. 1, includes an engine (internal combustion engine) 1, a clutch 2, a motor generator 3, a torque converter 4, and a transmission 5.

The engine 1 is a gasoline engine, a diesel engine, or a like publicly known power supply device for supplying a driving force by burning fuel. The engine 1 is controllable in terms of a throttle position for a throttle valve disposed in the intake path (intake air quantity), a fuel injection quantity, an ignition timing, and other operational conditions. The engine 1 supplies a travel driving force for driving wheels (e.g., rear wheels) 9. This output of the engine 1 is transmitted to the clutch 2 via a crankshaft 1a.

The clutch 2 is, for example, a friction power transmission and located between the engine 1 and the motor generator 3. The clutch 2 transmits power between the engine 1 and the motor generator 3 by coupling the crankshaft 1a of the engine 1 and a rotation shaft 3a of the motor generator 3. The clutch 2 obstructs power transmission between the engine 1 and the motor generator 3 by decoupling the crankshaft 1a and the rotation shaft 3a.

The motor generator 3 is adapted to act as an electric power generator as well as to act as an electric motor. The motor generator 3 is, for example, an AC synchronous electric motor with a rotor 31 made of a permanent magnet and a stator 32 containing three phase windings. The rotor 31 has the rotation shaft 3a integrally provided thereto. The rotation shaft 3a is connected to the clutch 2 and the torque converter 4.

The motor generator 3 supplies, besides the travel driving force for the driving wheels 9, a braking force by converting kinetic energy (rotation of the rotor 31) to electric energy (electric power generation). The motor generator 3 also acts as a starter motor when the engine 1 is started.

The torque converter 4 increases a torque input to an input shaft 4a for output to an output shaft 4b. The torque converter 4 includes a pump impeller 41 connected to the input shaft 4a, a turbine liner 42 connected to the output shaft 4b, a stator 43 for increasing torque, and a lockup mechanism 44 for directly connecting the input shaft 4a and the output shaft 4b. The torque converter 4 is connected to the rotation shaft 3a of the motor generator 3 via its input shaft 4a and to the input shaft of the transmission 5 via its output shaft 4b. The torque converter 4 is an example a fluid power transmission of the present invention.

The pump impeller 41 passes fluid (oil) to the turbine liner 42 as it rotates. The turbine liner 42 is rotated by the fluid thrown out by the pump impeller 41. When the pump impeller 41 and the turbine liner 42 are rotating at very different speeds, the stator 43 redirects the fluid returning from the turbine liner 42 to the pump impeller 41 to assist the rotation of the pump impeller 41 through the redirected fluid. The stator 43 is structured to rotate with the turbine liner 42 owing to the one-way clutch 43a when the rotational speeds of the pump impeller 41 and the turbine liner 42 differ slightly. The lockup mechanism 44 is provided to reduce a decrease in transmission efficiency by directly connecting the input shaft 4a and the output shaft 4b.

The transmission 5 is, for example, a stepped automatic transmission and changes the rotational speed of the input shaft for output to the output shaft. The output of the transmission 5 is transmitted to the driving wheels 9 via a propeller shaft 6, a differential device 7, and a drive shaft 8. The transmission 5 may be a continuously variable automatic transmission or a manual transmission.

The hybrid vehicle 100 includes a hydraulic pressure-based friction brake device 10 near the driving wheels 9. The friction brake device 10 includes, for example, a disc rotor rotating with the drive shaft 8 (driving wheels 9) and a brake caliber equipped with brake pads. The friction brake device 10 is structured to generate a braking force by squeezing the brake pads, driven by a brake actuator, against the disc rotor.

Electric Arrangement

Next, in reference to FIGS. 1 and 2, an electric arrangement of the hybrid vehicle 100 of the present embodiment will be described.

The hybrid vehicle 100, as illustrated in FIG. 1, includes the ECU (electronic control unit) 11, a battery 12, and an inverter 13.

The ECU 11 controls the hybrid vehicle 100. For example, the ECU controls the motion of the hybrid vehicle 100 by implementing various control processes, including the control of the operation of the engine 1, the control of the driving of the motor generator 3, and the collective control of the engine 1 and the motor generator 3. The ECU 11 is an example of the control device of the present invention.

Figure 2:
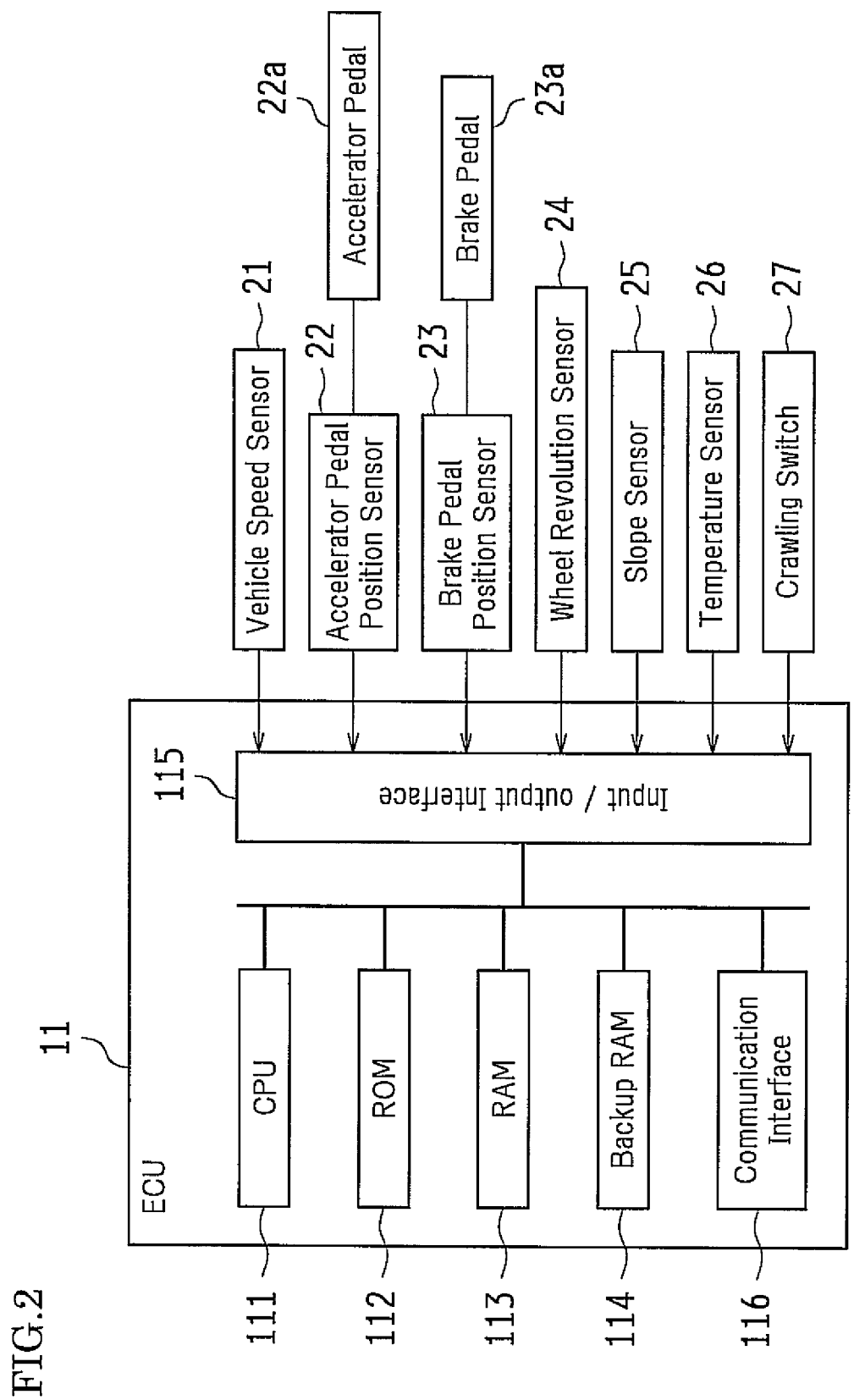
FIG. 2 is a block diagram representing the ECU for the hybrid vehicle shown in FIG. 1.

The ECU 11, as illustrated in FIG. 2, includes a CPU (central processing unit) 111, a ROM (read only memory) 112, a RAM (random access memory) 113, a backup RAM 114, an input/output interface 115, and a communication interface 116.

The CPU 111 executes computations based on the various control programs and maps stored in the ROM 112. The ROM 112 stores, for example, various control programs and maps which are referenced upon execution of the various control programs. The RAM 113 is a memory temporarily storing, for example, results of computations by the CPU 111 and results of detection by sensors. The backup RAM 114 is a non-volatile memory storing, for example, data which should be stored when the ignition is turned off.

The input/output interface 115 receives, for example, inputs of results of detection by sensors and provides, for example, outputs of control signals to various sections. The input/output interface 115 is connected to, for example, a vehicle speed sensor 21, an accelerator pedal position sensor 22, a brake pedal position sensor 23, a wheel revolution sensor 24, a slope sensor 25, a temperature sensor 26, and a crawling switch 27.

The vehicle speed sensor 21 detects the speed of the hybrid vehicle 100. The accelerator pedal position sensor 22 detects the amount of depression of the accelerator pedal 22a. The brake pedal position sensor 23 detects the amount of depression of the brake pedal 23a. The wheel revolution sensor 24 detects the rotational speed of the driving wheels 9. The slope sensor 25 detects a slope of the road surface. The temperature sensor 26 detects a temperature of the friction brake device 10 (e.g., temperature of the disc rotor). The crawling switch 27 turns on/off crawling (described later in detail).

The battery 12 includes a battery module which is a high voltage supply for traveling, a battery monitoring unit monitoring the battery module, and a system main relay connecting or disconnecting the battery module and the inverter 13.

The battery module of the battery 12 supplies electric power to drive the motor generator 3 and also stores electric power generated by the motor generator 3. The battery module is, for example, a rechargeable nickel-metal hydride battery or lithium-ion battery.

The inverter 13 is, for example, a three-phase bridge circuit with an IGBT and diodes and switched between regeneration and traveling as the turn on/off of the IGBT is controlled through a drive signal from the ECU 11.

Specifically, the inverter 13 converts the electric current supply from the battery 12 from DC to AC to drive the motor generator 3 (traveling) and also converts the electric current generated by the motor generator 3 in regenerative braking from AC to DC for output to the battery 12 (regeneration).

Traveling Condition

Next will be described exemplary traveling conditions of the hybrid vehicle 100 of the present embodiment.

For example, the hybrid vehicle 100 is capable of traveling by relying solely on the driving force from the engine 1, with the clutch 2 being engaged and the engine 1 running.

The hybrid vehicle 100 is also capable of traveling by relying on the combination of the driving force from the engine 1 and the driving force from the motor generator 3, with the clutch 2 being engaged, the engine 1 running, and the motor generator 3 outputting a travel driving force. Alternatively, the hybrid vehicle 100 is capable of regenerating power in the motor generator 3 from the driving force from the engine 1, with the clutch 2 being engaged and the engine 1 running.

The hybrid vehicle 100 is also capable of traveling by relying solely on the driving force from the motor generator 3 (EV driving), with the clutch 2 being released, the engine 1 being stopped, and the motor generator 3 outputting a driving force.

The hybrid vehicle 100 is also capable of having the motor generator 3 output a braking force, for example, during deceleration (while the accelerator pedal 22a is being released), with the clutch 2 being released and the motor generator 3 regenerating power.

In other words, the hybrid vehicle 100 is capable of intermittently run the engine 1 according to traveling and other conditions.

Crawling

Next will be described crawling by the hybrid vehicle 100 of the present embodiment.

The hybrid vehicle 100 starts crawling, for example, when the crawling switch 27 is manipulated during normal driving and terminates crawling, for example, when the crawling switch 27 is manipulated during crawling.

Crawling is a traveling mode where the vehicle travels while maintaining a very low, constant vehicle speed (the vehicle is controlled to travel at a very low, constant vehicle speed) in order to travel off-road or on a slippery road surface. The constant vehicle speed may be chosen arbitrarily by the driver from predetermined speeds: for example, 1 km/h, 2 km/h, 3 km/h, 4 km/h, and 5 km/h.

During crawling, the hybrid vehicle 100 automatically controls the travel driving force output of the engine 1 and the braking force output of the friction brake device 10 collectively, with the accelerator pedal 22a and the brake pedal 23a being released, to maintain a very low, constant vehicle speed.

Figure 3:
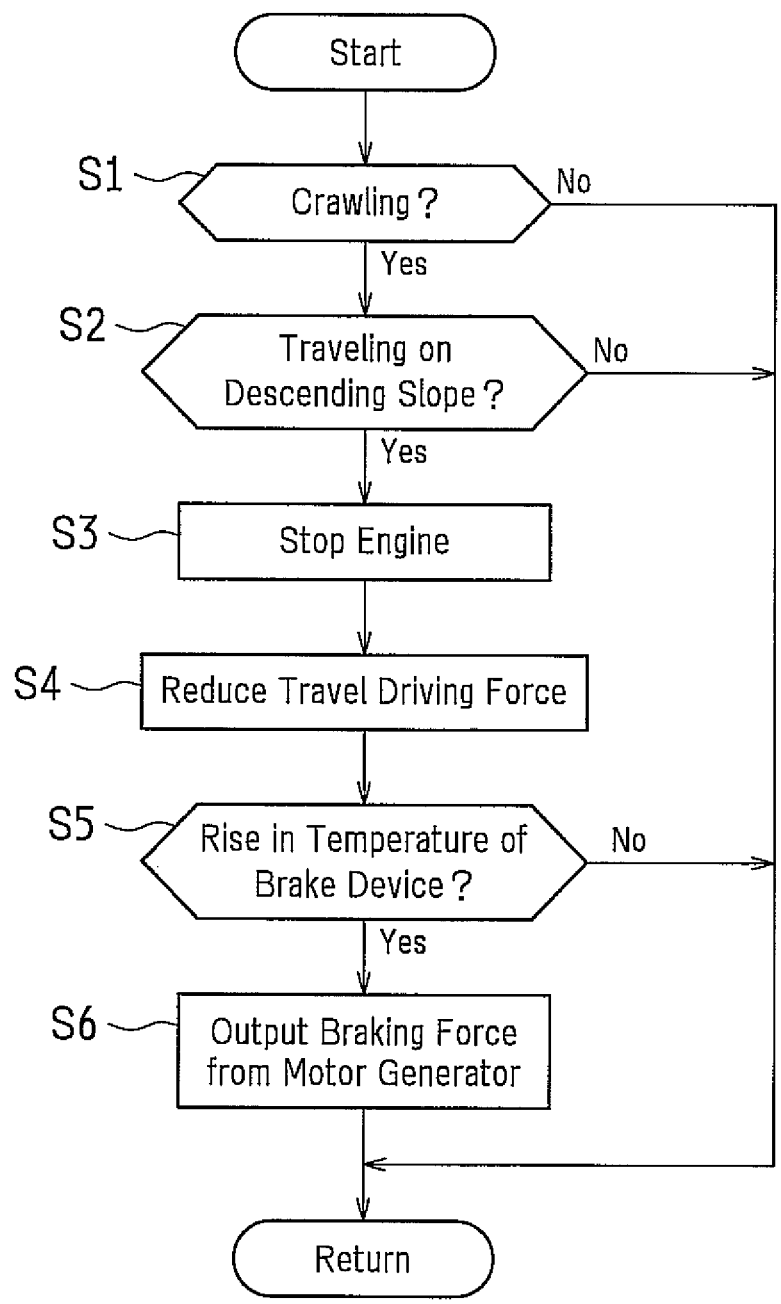
FIG. 3 is a flow chart depicting the operation of the hybrid vehicle in FIG. 1 during crawling.

FIG. 3 is a flow chart depicting the operation of the hybrid vehicle of the present embodiment during crawling. Next will be described the operation of the hybrid vehicle 100 of the present embodiment during crawling. Note that the operation described below is repeatedly performed at predetermined intervals and the steps described below are implemented by the ECU 11.

First, in step S1, it is determined whether the vehicle is crawling. If it is determined that the vehicle is crawling, the operation proceeds to step S2. On the other hand, if it is determined that the vehicle is not crawling, the operation proceeds to Return.

Next, in step S2, it is determined from a result of detection by the slope sensor 25 whether the vehicle is traveling on a descending slope. If it is determined that the vehicle is traveling on a descending slope, the operation proceeds to step S3. On the other hand, if it is determined that the vehicle is not traveling on a descending slope (traveling on a flat road or an ascending slope), the operation proceeds to Return.

Next, in step S3, the engine 1 is stopped. Simultaneously, the clutch 2 is released to obstruct power transmission between the engine 1 and the motor generator 3. Then, in step S4, the travel driving force output to the driving wheels 9 (drive shaft 8) is reduced. Besides, the motor generator 3 outputs a travel driving force because the engine 1 has stopped running. The driving force output of the motor generator 3 to the driving wheels 9 is controlled to be lower than when the engine 1 is idling, and is such that the vehicle can crawl on a descending slope. In other words, in this situation, the hybrid vehicle 100, traveling on a descending slope, is controlled to travel at a constant vehicle speed through collective control of the travel driving force output of the motor generator 3 (e.g., driving force lower than idle torque) and the braking force output of the friction brake device 10.

Next, in step S5, it is determined from a result of detection by the temperature sensor 26 whether the temperature of the friction brake device 10 has risen. Whether the temperature has risen or not may be determined, for example, according to whether the result of detection by the temperature sensor 26 has exceeded a predetermined threshold or according to a map containing as parameters results of detection by the temperature sensor 26, temperatures of the friction brake device 10 before the start of crawling, etc. If it is determined that the temperature of the friction brake device 10 has risen, the operation proceeds to step S6 because the descending slope is so steep that the motor generator 3 does not need to output a travel driving force for crawling. On the other hand, if it is determined that the temperature of the friction brake device 10 has not risen, the operation proceeds to Return.

Next, in step S6, the motor generator 3 generates power to output a braking force. In this situation, the hybrid vehicle 100, traveling on a descending slope and generating no travel driving force, is controlled to travel at a constant vehicle speed through control of the braking force output of the motor generator 3 and the braking force output of the friction brake device 10. Besides, the lockup mechanism 44 of the torque converter 4 is not activated. Accordingly, the rotational speeds of the rotation shaft 3a of the motor generator 3 and the input shaft 4a of the torque converter 4 decrease so that the rotational speed of the input shaft 4a becomes lower than the rotational speed of the output shaft 4b in the torque converter 4. This enables the braking force output of the motor generator 3 to be transmitted to the driving wheels 9 via the torque converter 4. Besides, the braking force output of the motor generator 3 grows larger with a rise in the temperature of the friction brake device 10.

Effects

In the present embodiment, as detailed above, the engine 1 is stopped, outputting no idle torque, when the vehicle is crawling on a descending slope. That renders the travel driving force output to the driving wheels 9 smaller than during idling. The load on the friction brake device 10 is thus reduced.

In addition, in the present embodiment, when the engine 1 has stopped running, the travel driving force output to the driving wheels 9 is reduced to be lower than when the engine 1 is idling, by the motor generator 3 outputting a travel driving force. In other words, crawling is possible even if the engine 1 has stopped running.

In addition, in the present embodiment, if the temperature of the friction brake device 10 has risen, the motor generator 3 outputs a braking force as part of the required braking force. That allows the friction brake device 10 to output a smaller braking force. The load on the friction brake device 10 is thus further reduced.

In addition, in the present embodiment, the braking force output of the motor generator 3 grows larger with a rise in the temperature of the friction brake device 10. Thus, the motor generator 3 reduces the load on the friction brake device 10 progressively with a growing load on the friction brake device 10.

In addition, in the present embodiment, the provision of the torque converter 4 enables the rotor 31 to continuously rotate even if the driving wheels 9 (the output shaft 4b of the torque converter 4) have stopped rotating. That prevents the motor generator 3 from being locked. The "locking" of the motor generator 3 refers to the rotor 31 having stopped its rotation. Driving the rotor 31 when it is locked gives rise to a problem that excess electric current will flow in a single phase. In other words, the provision of the torque converter 4 prohibits the motor generator 3 from being locked, thereby preventing the problem from occurring. Besides, setting the rotational speed of the input shaft 4a lower than the rotational speed of the output shaft 4b in the torque converter 4 enables the braking force from the motor generator 3 to be transmitted to the driving wheels 9.

OTHER EMBODIMENTS

The embodiment disclosed above is illustrative in every respect and do not form any grounds for limited interpretation. Therefore, the technical scope of the present invention should not be interpreted based only on the embodiment above, but should be determined based also on the claims attached. In addition, the technical scope of the present invention encompasses all modifications within the meets and bounds of the equivalents of the claims.

For instance, the embodiment above gives an example of the present invention being applied to the ECU 11 of the hybrid vehicle 100 which has been assumed to be an FR vehicle. This is by no means intended to be limiting the invention. Alternatively, the invention is applicable to a control device for 4WD and FF hybrid vehicles.

The embodiment above gives an example of the present invention being applied to the ECU 11 of the hybrid vehicle 100 having a single motor generator 3. This is by no means intended to be limiting the invention. Alternatively, the invention is applicable to a control device for a "power-split" hybrid vehicle including two or more motor generators and a power-split mechanism.

Furthermore, in the embodiment above, when the vehicle is crawling on a flat road or an ascending slope, the constant vehicle speed control may be implemented by starting or continuously running the engine 1.

The embodiment above gives an example in which it is determined from a result of detection by the slope sensor 25 whether the vehicle is traveling on a descending slope. This is by no means intended to be limiting the invention. Alternatively, whether the vehicle is traveling on a descending slope or not may be determined from, for example, the acceleration of the hybrid vehicle 100 achieved in response to the travel driving force output of the driving wheels 9.

The embodiment above gives an example in which the lockup mechanism 44 of the torque converter 4 is not activated during crawling. This is by no means intended to be limiting the invention. Alternatively, the lockup mechanism 44 of the torque converter 4 may be active during crawling. In other words, the embodiment gives an example in which the torque converter 4 is provided. This is by no means intended to be limiting the invention. Alternatively, no torque converter may be provided.

The embodiment above gives the torque converter 4 as an example of the fluid power transmission of the present invention. This is by no means intended to be limiting the invention. Alternatively, a fluid coupling having no stator 43 or no torque increasing functions may be used as the fluid power transmission of the present invention.

The embodiment above gives an example in which the temperature sensor 26 is provided which detects the temperature of the disc rotor of the friction brake device 10 so that the motor generator 3 can output a braking force in response to a rise in the temperature. This is by no means intended to be limiting the invention. Alternatively, a temperature sensor may be provided which detects the temperature of the brake actuator so that the motor generator 3 can output a braking force in response to a rise in the temperature.

The embodiment above gives an example in which the motor generator 3 outputs a braking force which grows larger with a rise in the temperature of the friction brake device 10. This is by no means intended to be limiting the invention. Alternatively, the motor generator 3 may output a braking force which grows larger with an increase in the required braking force (total braking force). In other words, the motor generator 3 may output a growing proportion of the total braking force as the required braking force increases.

The embodiment above gives an example in which the friction brake device 10 is of a disc type. This is by no means intended to be limiting the invention. Alternatively, the friction brake device may be of a drum type.

Step S3 of the embodiment above gives an example in which the clutch 2 is released when the engine 1 has stopped. This is by no means intended to be limiting the invention. Alternatively, when the engine 1 has stopped, the clutch 2 may be left engaged.

In the embodiment above, the ECU 11 may include a plurality of ECUs, such as a HV (hybrid) ECU generally controlling the hybrid vehicle 100, an MG (motor generator) ECU controlling driving of the inverter 13, an engine ECU controlling the operation of the engine 1, and a brake ECU controlling the friction brake device 10.

In the embodiment above, the vehicle may be configured to be capable of such cruising (constant vehicle speed control at high vehicle speed) that the engine 1 does not stop running during cruising. Crawl control is intended, for example, for traveling off-road at a constant vehicle speed (very low vehicle speed). As a result, there will occur large changes in the driving force. A change in the driving force due to the engine 1 having stopped therefore will unlikely make the driver feel uncomfortable. In contrast, cruise control is intended, for example, for traveling on a highway at a constant vehicle speed (not very low vehicle speed, but high vehicle speed as an example). As a result, there will occur relatively small changes in the driving force when compared with crawl control. A change in the driving force due to the engine 1 having stopped therefore can make the driver feel uncomfortable. Prohibiting the engine 1 from stopping in cruise control renders it less likely for the driver to feel uncomfortable.

REFERENCE SIGNS LIST

1 Engine
2 Clutch
3 Motor Generator
4 Torque Converter (Fluid Power Transmission)
9 Driving Wheel
10 Friction Brake Device (Brake Device)
11 ECU (Control Device)
100 Hybrid Vehicle (Vehicle)

The invention claimed is:

1. A control device for a vehicle including an engine and a motor generator both for supplying a travel driving force to a driving wheel,
   the control device causing the engine to stop such that the engine does not generate an idle torque while the vehicle is traveling on a descending slope under constant vehicle speed control where the vehicle is controlled to travel at a predetermined vehicle speed,
   wherein the control device implements the constant vehicle speed control by causing a brake device on the vehicle to supply a braking force while causing the motor generator to act as an electric motor supplying a travel driving force.

2. The control device as set forth in claim 1, wherein
   the control device allows the motor generator to supply a braking force when a temperature of the brake device has risen.

3. The control device as set forth in claim 2, wherein
   the control device allows the motor generator to supply a braking force which grows larger with a rise in the temperature of the brake device.

4. The control device as set forth in claim 1,
   the vehicle further including a clutch between the engine and the motor generator, the control device causing the clutch to be released when the engine has stopped while the vehicle is traveling on a descending slope.

5. The control device as set forth in claim 1, wherein
   the predetermined vehicle speed is a very low vehicle speed at which the vehicle travels off-road.

6. The control device as set forth in claim 2,
   the vehicle further including a clutch between the engine and the motor generator, the control device causing the clutch to be released when the engine has stopped while the vehicle is traveling on a descending slope.

7. The control device as set forth in claim 3,
   the vehicle further including a clutch between the engine and the motor generator, the control device causing the clutch to be released when the engine has stopped while the vehicle is traveling on a descending slope.

8. The control device as set forth in claim 2, wherein
   the predetermined vehicle speed is a very low vehicle speed at which the vehicle travels off-road.

9. The control device as set forth in claim 3, wherein
   the predetermined vehicle speed is a very low vehicle speed at which the vehicle travels off-road.

10. The control device as set forth in claim 4, wherein
    the predetermined vehicle speed is a very low vehicle speed at which the vehicle travels off-road.

11. A control device for a vehicle including an engine and a motor generator both for supplying a travel driving force to a driving wheel,
    the control device causing the engine to stop such that the engine does not generate an idle torque while the vehicle is traveling on a descending slope under constant vehicle speed control where the vehicle is controlled to travel at a predetermined vehicle speed, the control device implementing the constant vehicle speed control by causing a brake device on the vehicle to supply a braking force while causing the motor generator to act as an electric motor supplying a travel driving force, if the predetermined vehicle speed is a very low vehicle speed, and
    the control device not causing the engine to stop under the constant vehicle speed control if the predetermined vehicle speed is not a very low vehicle speed.

* * * * *